United States Patent
Dean et al.

(10) Patent No.: US 9,545,877 B2
(45) Date of Patent: Jan. 17, 2017

(54) STEERING WHEEL BEZEL WITH INTEGRATED HORN SWITCH FUNCTION

(71) Applicant: FORD GLOBAL TECHNOLOGIES, LLC, Dearborn, MI (US)

(72) Inventors: Michael Joseph Dean, Westland, MI (US); James Robert Chascsa, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 14/612,869

(22) Filed: Feb. 3, 2015

(65) Prior Publication Data

US 2016/0221499 A1    Aug. 4, 2016

(51) Int. Cl.
| | | |
|---|---|---|
| *H01H 9/00* | (2006.01) | |
| *B60Q 5/00* | (2006.01) | |
| *B62D 1/04* | (2006.01) | |

(52) U.S. Cl.
CPC ............. *B60Q 5/003* (2013.01); *B62D 1/046* (2013.01)

(58) Field of Classification Search
CPC ............ H01H 2231/026; B60Q 5/003–1/0082; B60R 21/2037; B60R 21/21658
USPC ...................................................... 200/61.54
See application file for complete search history.

(56) References Cited

U.S. PATENT DOCUMENTS

| | | | |
|---|---|---|---|
| 2,147,007 A | | 1/1939 | Peters et al. |
| 4,742,192 A | | 5/1988 | Levine et al. |
| 5,338,906 A | * | 8/1994 | Yokota .................. B60R 21/203 |
| | | | 200/61.54 |
| 6,592,142 B2 | * | 7/2003 | Landen .................. B60Q 5/003 |
| | | | 280/728.2 |
| 6,700,086 B2 | * | 3/2004 | Serizawa ............. H01H 13/702 |
| | | | 200/512 |
| 7,348,508 B2 | | 3/2008 | Worrell |
| 7,887,088 B2 | | 2/2011 | Worrell et al. |

FOREIGN PATENT DOCUMENTS

CA          2275055 A1    12/2000

* cited by examiner

*Primary Examiner* — Vanessa Girardi
(74) *Attorney, Agent, or Firm* — Vichit Chea; King & Schickli, PLLC (57) ABSTRACT

A steering wheel assembly for a motor vehicle includes a steering wheel having a rim, a hub, and spokes connecting the rim and hub. An airbag module is disposed on the hub. Horn activating switches are disposed on the plurality of spokes. A bezel is disposed adjacent to the airbag module for actuating the horn, the bezel being movably mounted to the steering wheel to contact any of the horn activating switches. At least a portion of the bezel is axially movable relative to the steering wheel to contact any of the horn activating switches, whereby a motor vehicle operator may actuate the horn by pressing on the bezel without contacting any portion of the airbag module.

19 Claims, 7 Drawing Sheets

STEERING WHEEL BEZEL WITH INTEGRATED HORN SWITCH FUNCTION

TECHNICAL FIELD

This disclosure relates generally to motor vehicle horns, and more particularly to a steering wheel-mounted horn actuator assembly including a floating bezel for actuating the horn without pressing on an airbag module associated with the steering wheel.

BACKGROUND

Figure 1:
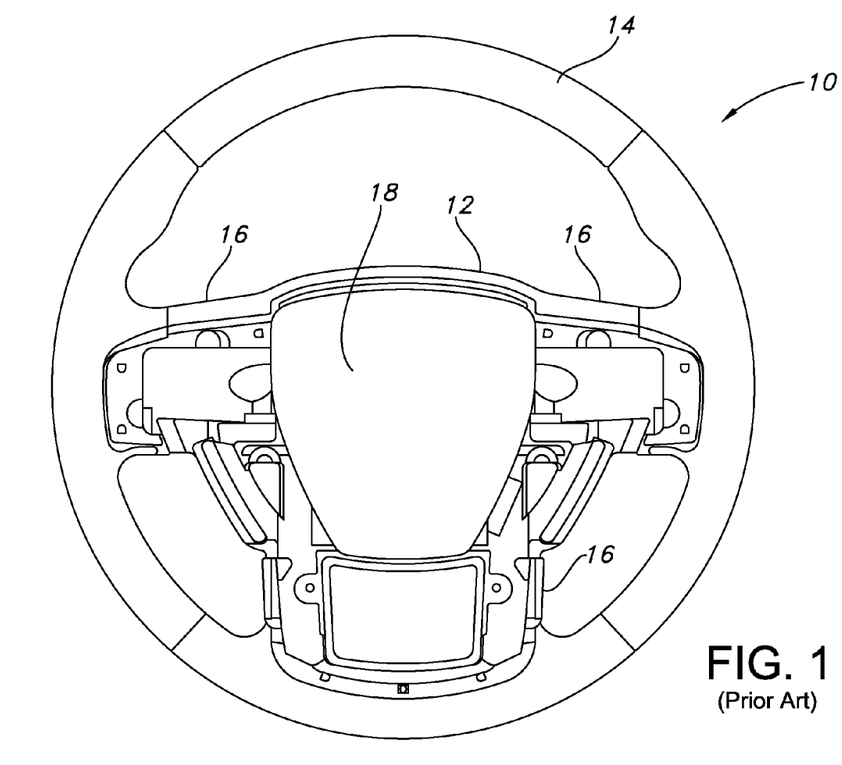
FIG. 1 depicts a prior art motor vehicle steering wheel assembly.

With reference to FIG. 1, it is known to provide a motor vehicle steering wheel assembly 10 including a hub 12, a rim 14, and one or more spokes 16 connecting the two. It is required to provide a driver airbag module and cover 18, typically associated with the steering wheel and steering column (not shown), configured whereby if deployed on a collision the airbag will prevent the motor vehicle operator's head and/or chest from striking the steering wheel assembly 10. The conventional airbag module includes an airbag, one or more crash sensors for detecting a collision, an inflator which rapidly inflates the airbag with a pressurized gas such as nitrogen on receipt of a signal from the crash sensors, and a cover disposed over the airbag and mechanism to protect the airbag and deploying mechanism and for aesthetic reasons.

Another requirement of the modern motor vehicle is that the operator must be able to actuate a horn to alert other drivers and pedestrians, and typically the horn is located on the steering wheel for ease of access. Actuation of the motor vehicle horn on most conventional steering wheel systems requires a horn actuator switch shared between the steering wheel and the driver airbag module, a dedicated horn actuator switch activated by pressing on the driver airbag module, or micro-switches associated with a floating cover of the driver airbag module and actuated by pressing on that cover. Each of these configurations, while effective, involves the driver airbag module and requires balancing multiple design and safety concerns. Further, horn actuator systems involving the driver airbag module, such as floating airbag module covers for actuating a horn mechanism, increase complexity and so cost of the systems.

To solve these and other problems, the present disclosure relates to a motor vehicle steering wheel assembly including a floating bezel for actuating a horn of the vehicle without in any way involving the driver airbag module. It will be appreciated that the term "floating" as used in this disclosure refers to a bezel mounted to the steering wheel assembly in such a way as to allow axial movement of at least a portion of the bezel relative to the steering wheel to actuate the horn. It will be appreciated also that the term "airbag module" as used herein refers to any individual element of the airbag module as described above, and to all elements collectively making up the airbag module. The described assembly thus allows the motor vehicle operator to actuate the horn by pressing on a portion of the bezel, without requiring pressing on or otherwise displacing any portion of the driver airbag module, including any cover provided for the airbag module.

SUMMARY

In accordance with the purposes and benefits described herein, in one aspect a steering wheel assembly for a motor vehicle including a horn activation mechanism is provided. The assembly includes a steering wheel having a rim, a hub, and one or more spokes connecting the rim and hub. The assembly further includes an airbag module associated with the hub, and one or more horn activating switches disposed on the one or more spokes. A floating bezel is disposed on the steering wheel, at least a portion of which is disposed adjacent to the airbag module. The bezel is movably mounted to the steering wheel for movement independent of and without displacing the airbag module. More specifically, at least a portion of the bezel is axially movable relative to the steering wheel to contact any of the one or more horn activating switches without in any way involving the airbag module. By contacting any of the one or more horn activating switches, the bezel activates a motor vehicle horn. In embodiments, the bezel includes one or more axially movable wings for contacting any of the one or more horn activating switches. By pressing on a portion of the bezel, the motor vehicle operator can activate the horn without any involvement of the driver airbag module.

In embodiments, the horn activating switches may be one or more micro switches disposed adjacent to one or more displaceable or compressible bosses. In other embodiments, the horn activating switches may be one or more micro switches disposed adjacent to one or more compressible springs. In yet other embodiments, the horn activating switches may comprise a metal contact disposed adjacent to one or more displaceable or compressible bosses, with the bezel wings including cooperating metal contacts for completing an electrical circuit to activate the horn.

In another aspect, a horn actuator assembly for a motor vehicle is described. The assembly includes a horn, a steering wheel having a hub connected to a rim by a plurality of spokes and an airbag module associated with the hub, and one or more switches as described above for actuating the horn disposed on the plurality of spokes. A bezel is disposed on the steering wheel as described above, the bezel being movably mounted to contact any of the one or more switches to actuate the horn. At least a portion of the bezel, for example one or more an axially movable wing thereof, is axially movable relative to the steering wheel to contact the any of the one or more switches without displacing or contacting any portion of the airbag module.

In yet another aspect, a method for actuating a motor vehicle horn is described. A steering wheel assembly as described above is provided. In use, a motor vehicle operator presses on a portion of a steering wheel bezel disposed on the steering wheel to actuate the horn, without otherwise contacting or involving the driver airbag module.

In the following description, there are shown and described embodiments of the disclosed motor vehicle steering wheel assembly. As it should be realized, the structure is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle steering wheel assembly, and together with the description serve to explain certain principles thereof. In the drawings.

Reference will now be made in detail to embodiments of the disclosed motor vehicle steering wheel assembly, examples of which are illustrated in the accompanying drawing figures.

DETAILED DESCRIPTION

Figure 2:
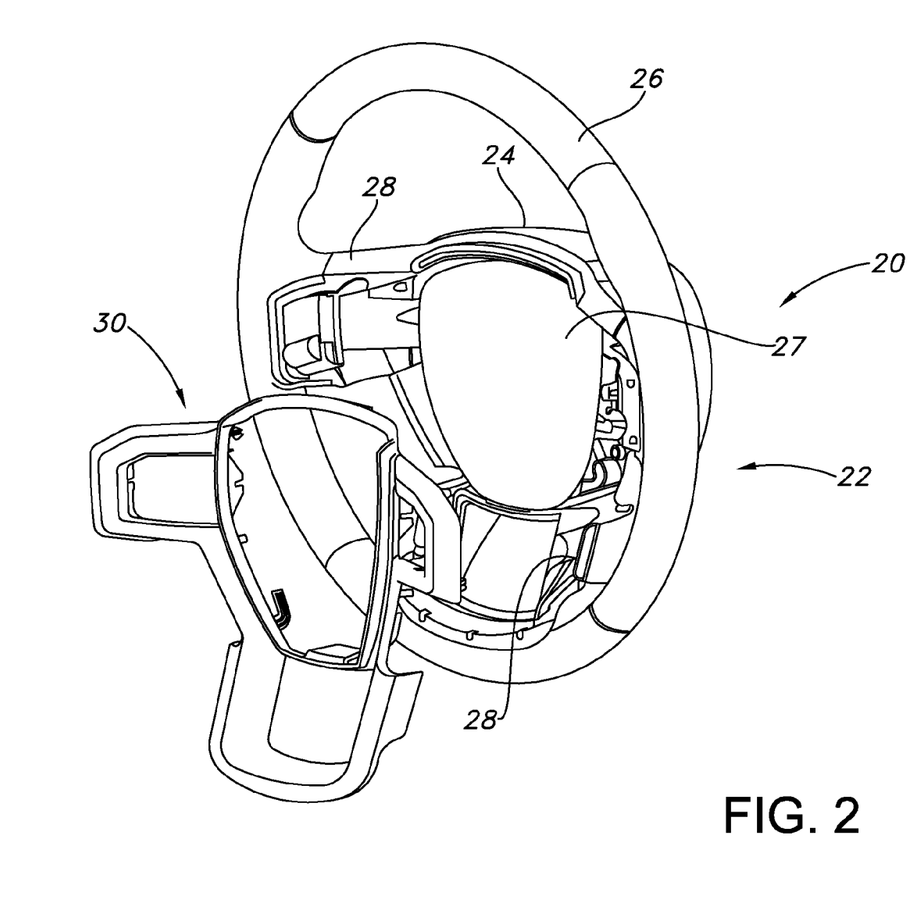
FIG. 2 is an exploded view of a motor vehicle steering wheel assembly according to the present disclosure.

With reference to FIG. 2, to address the above-discussed issues the present disclosure relates to a motor vehicle steering wheel assembly 20 including a floating bezel for horn activation. With reference to FIG. 2, the steering wheel assembly 20 includes a steering wheel 22 having a hub 24, a rim 26, and one or more spokes 28 connecting the hub 24 and the rim 26. An airbag module 27 is associated with steering wheel hub 24. A floating bezel 30 is provided, configured as will be described in detail below to allow the motor vehicle operator to actuate the motor vehicle horn.

Figure 3:
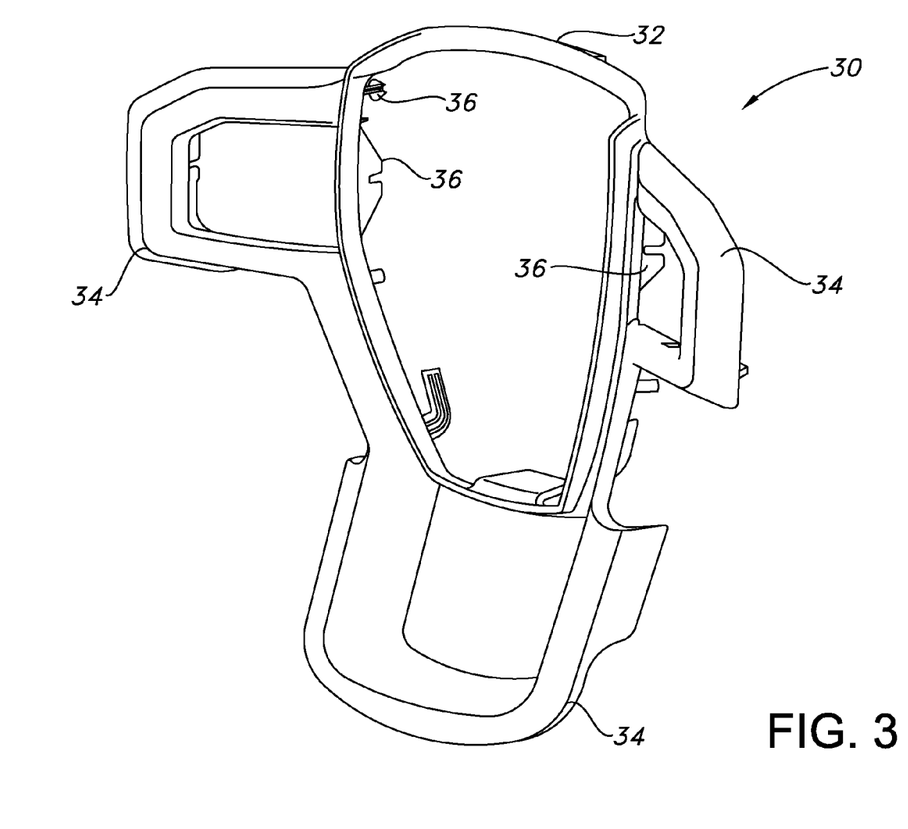
FIG. 3 depicts a front perspective view of an embodiment of a bezel for the steering wheel assembly of FIG. 2.

With reference to FIG. 3, bezel 30 includes a bezel hub 32, and one or more wings 34 extending radially from bezel hub 32. In the depicted embodiment, bezel hub 32 is configured whereby in the assembled steering wheel assembly 20, bezel hub 32 concentrically surrounds the airbag module 27 (not shown in this view) such that at least a portion of bezel 30 can be axially moved to actuate the motor vehicle horn without pressing on or otherwise contacting any portion of the airbag module 27. However, it will be appreciated that bezel hub 32 may assume any desired and suitable configuration, with the caveat that the required movement of the bezel 30 can be accomplished without pressing on or otherwise contacting any surface of the airbag module 27.

Typically, at least for aesthetic reasons the number of wings 34 will match the number of steering wheel spokes 28 connecting the steering wheel hub 24 and the steering wheel rim 26. Also, the wings 34 will typically be disposed about bezel hub 32 whereby on the assembled steering wheel assembly 20 the wings 34 will substantially overlay the steering wheel spokes 28. One or more clips 36 of varying design are disposed on a rear surface of bezel 30, to mate with cooperating receivers (not shown in this view) disposed on a mating surface of steering wheel hub 24 and/or spokes 28. These clips 36 and cooperating receivers retain bezel 30 in place, but allow at least a limited amount of axial movement of the bezel 30 relative to the steering wheel 22.

Figure 4:
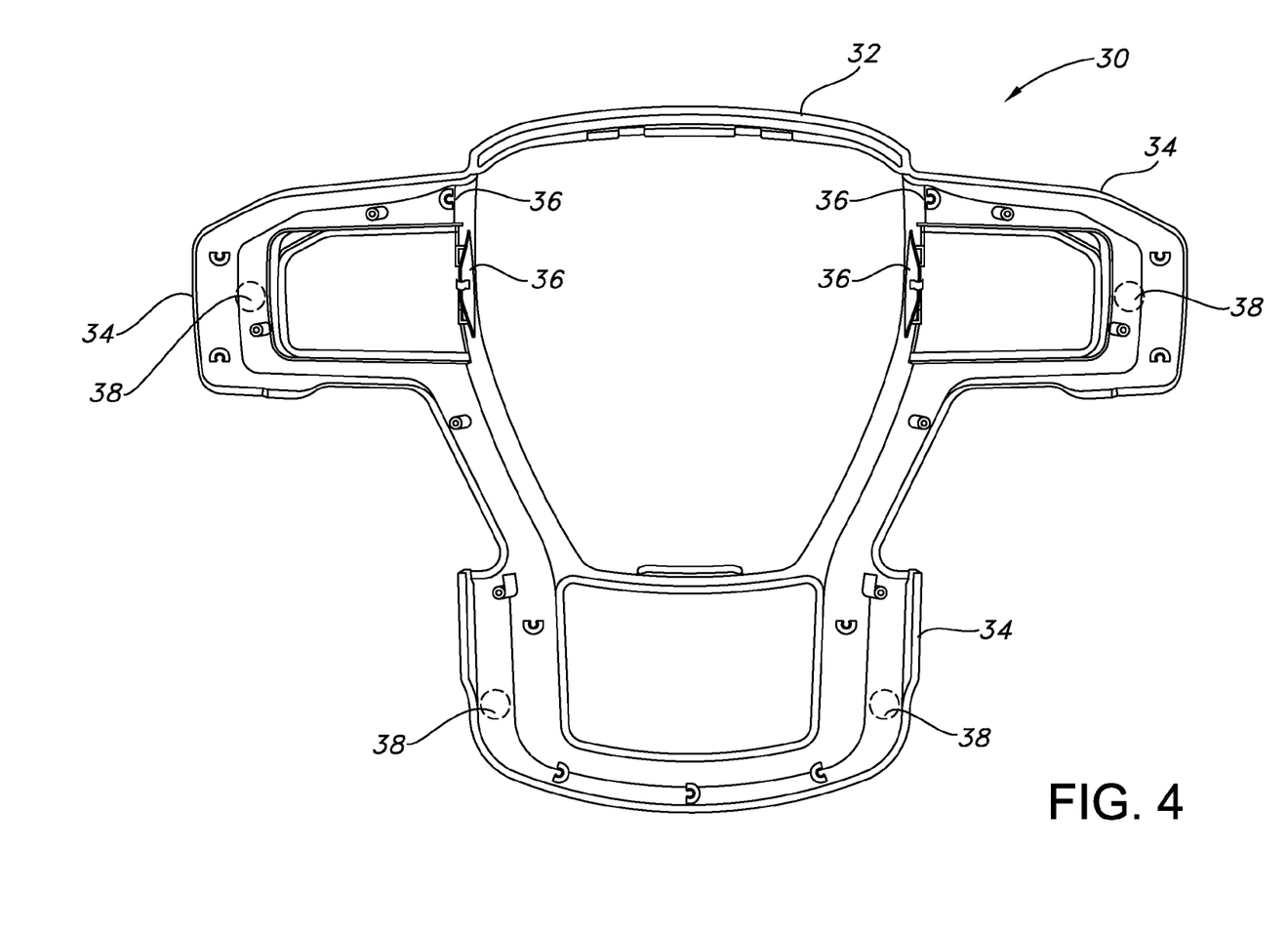
FIG. 4 depicts a rear view of the bezel for the steering wheel assembly of FIG. 2.
Figure 5:
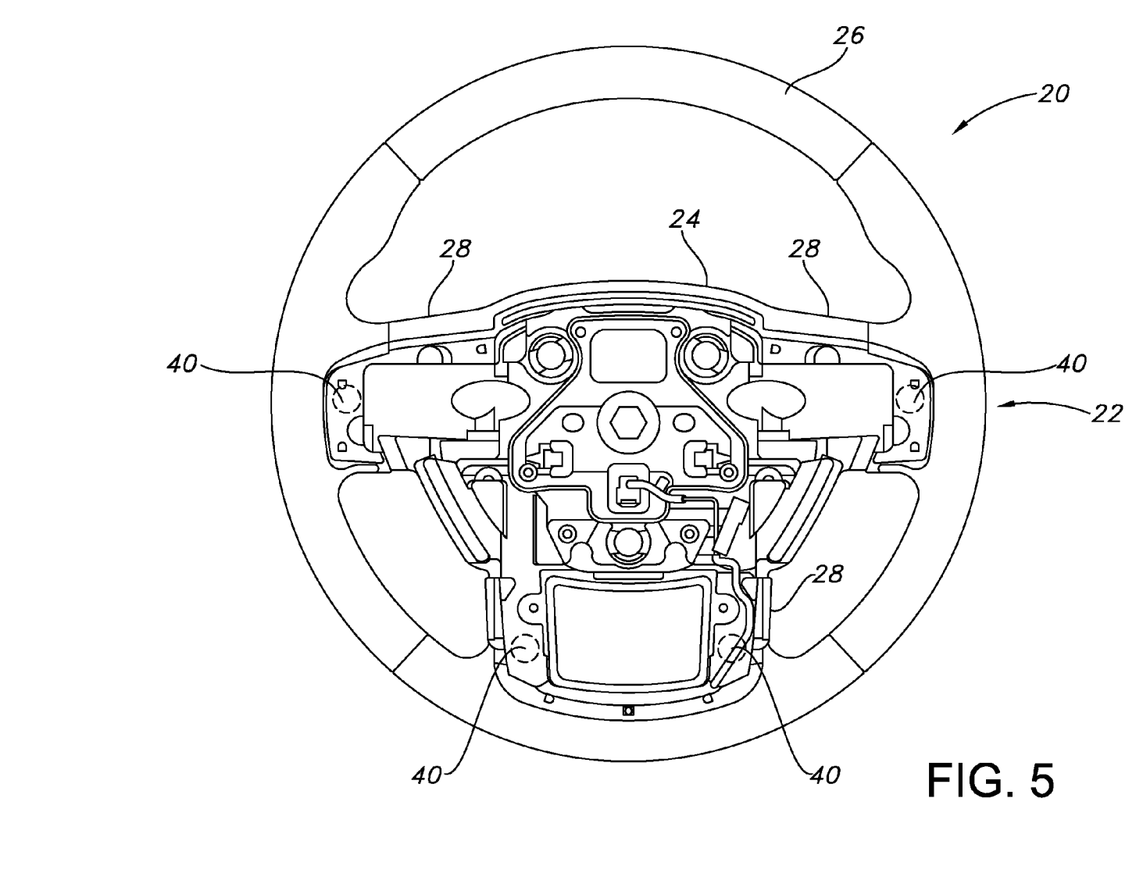
FIG. 5 depicts a front view of a steering wheel assembly according to the present disclosure.

The rear surface of bezel 30 also includes one or more contact points 38 for activating a motor vehicle horn (see FIG. 4). In the disclosed embodiment, contact points 38 are disposed on a rear surface of bezel wings 34. As will be discussed in greater detail below, contact points 38 contact cooperating structures 40 (see FIG. 5) disposed on steering wheel spokes 28 to actuate the horn. In combination, bezel contact points 38 and steering wheel cooperating structures 40 define a horn activation mechanism 42.

With reference to FIGS. 6A-6D, a variety of horn activation mechanisms 42 are contemplated. In one embodiment (see FIG. 6A), a micro switch 44 is disposed adjacent to one or more displaceable or compressible bosses 46. When an operator is not pressing on a wing 34 or other surface of bezel 30, bosses 46 bias the bezel 30 away from contact with the micro switch 44. When an operator presses on a wing 34 or other surface of bezel 30, at least that wing 34 and contact point 38 disposed thereon are axially displaced (see arrow) relative to the steering wheel 22. Bosses 46 are displaced or compressed by contact point 38, and micro switch 44 is actuated to sound the horn. When the operator ceases pressing on wing 34, displaceable or compressible bosses 46 return to their original configuration, and so contact point 38 is biased away from and ceases to actuate micro switch 44. Thus, by this structure bezel 30 is a "floating" bezel.

Figure 6A:
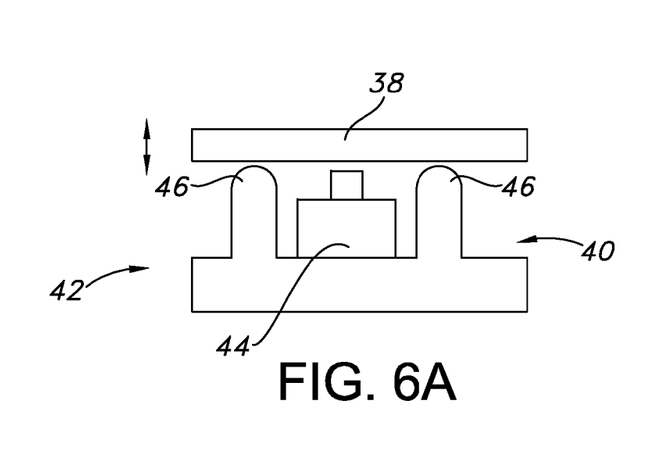
FIG. 6A depicts an embodiment of a horn activation mechanism according to the present disclosure.
Figure 6B:
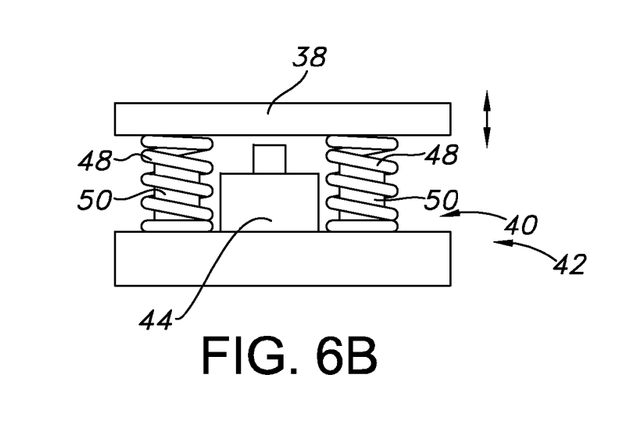
FIG. 6B depicts an alternative embodiment of a horn activation mechanism according to the present disclosure.

In another embodiment as shown in FIG. 6B, bosses 46 are replaced by one or more compressible springs 48, which may be mounted on posts 50. When an operator is not pressing on a wing 34 or other surface of bezel 30, compressible springs 48 bias the bezel 30 away from contact with micro switch 44. When an operator presses on a wing 34 or other surface of bezel 30, at least that wing 34 and contact point 38 disposed thereon are axially displaced (see arrow) relative to the steering wheel 22. Compressible springs 48 are compressed by contact point 38, and micro switch 44 is actuated to sound the horn. When the operator ceases pressing on wing 34, compressible springs 48 return to their prior configuration, and contact point 38 is biased away from and ceases to actuate micro switch 44.

Figure 6C:
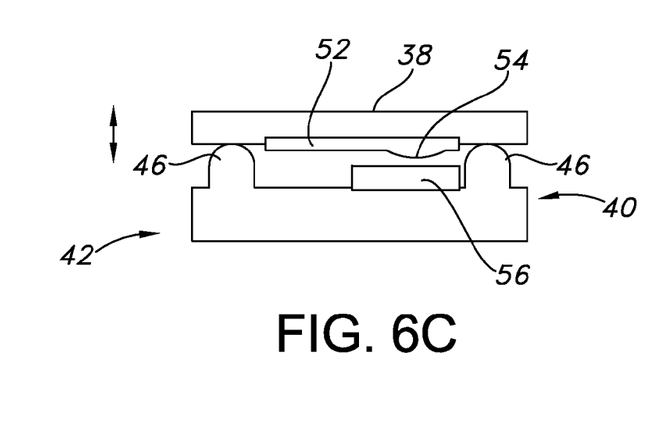
FIG. 6C depicts an alternative embodiment of a horn activation mechanism according to the present disclosure.
Figure 6D:
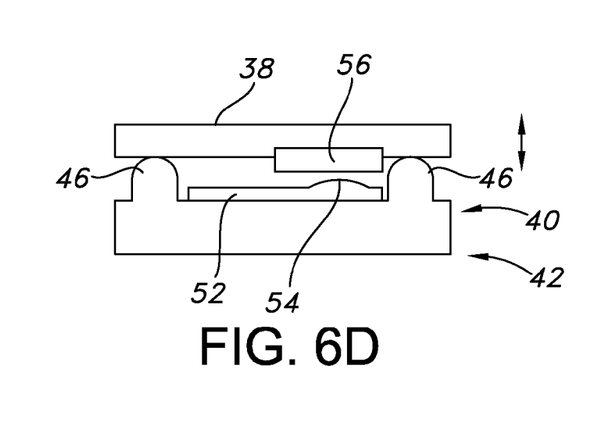
FIG. 6D depicts an alternative embodiment of a horn activation mechanism according to the present disclosure.

In yet another embodiment, micro switch 44 is replaced by cooperating metal contacts for completing an electrical circuit to activate the horn. As shown in FIG. 6C, in one embodiment bezel contact point 38 carries a metal strip 52 including a contact rivet 54. Steering wheel spoke 28 cooperating structure 40 carries a cooperating metal strip 56. When an operator is not pressing on a wing 34 or other surface of bezel 30, bosses 46 bias contact point 38 away from cooperating structure 40. When an operator presses on a wing 34 or other surface of bezel 30, at least that wing 34 and contact point 38 disposed thereon are axially displaced (see arrow) relative to the steering wheel 22. Bosses 46 are displaced or compressed by contact point 38, and contact rivet 54 contacts cooperating metal strip 56 to complete an electrical circuit and sound the horn. When the operator ceases pressing on wing 34, displaceable or compressible bosses 46 return to their original configuration, and the contact rivet 54 is biased away from cooperating metal strip 56 to terminate the electrical circuit.

In still yet another embodiment (see FIG. 6D), bezel contact point 38 carries the cooperating metal strip 56 and steering wheel spoke 28 cooperating structure 40 carries the metal strip 52 including contact rivet 54. Actuation of the horn is substantially as described above for the embodiment of FIG. 6C.

Figure 7:
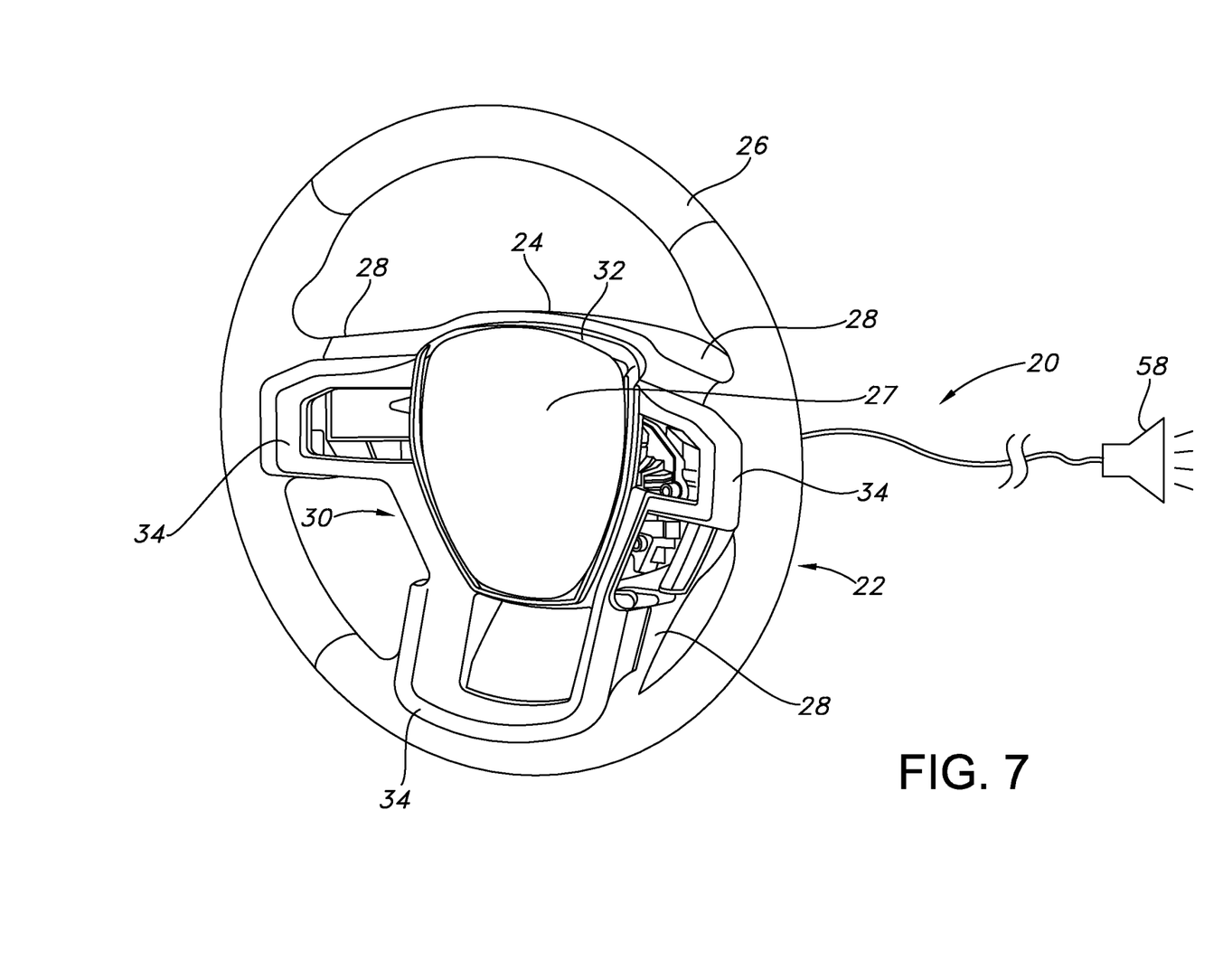
FIG. 7 is a front perspective view of a motor vehicle steering wheel assembly according to the present disclosure.

The completed steering wheel assembly 20 is shown in FIG. 7, including a horn 58 operatively linked to a horn activation mechanism 42 as described above. As described above, bezel 30 is mounted to steering wheel 22 such that axial movement of at least wings 28 relative to the steering wheel 22 is possible. In the depicted embodiment, bezel hub 32 concentrically surrounds but does not contact airbag module 27, although as discussed above alternative configurations for bezel hub 32 are possible and contemplated for use herein. When the motor vehicle operator presses on bezel 30 (for example on one of wings 28), horn 58 is actuated by the any of the mechanisms described above, but without any involvement of or pressing on airbag module 27.

Thus, by the above-described structures, a motor vehicle horn activation mechanism is provided which allows the motor vehicle operator to actuate the horn from multiple locations on a steering wheel bezel, but which does not involve any structures associated with the driver airbag module, the airbag module cover, etc. By this mechanism, a simplified and more economical horn activation mechanism is provided, which further reduces the need to integrate safety considerations associated with including the driver airbag module in the vehicle horn activation mechanisms.

Obvious modifications and variations are possible in light of the above teachings. All such modifications and variations are within the scope of the appended claims when interpreted in accordance with the breadth to which they are fairly, legally and equitably entitled.

What is claimed:

1. A horn actuator assembly for a motor vehicle, comprising:
    a horn;
    a steering wheel having a hub connected to a rim by one or more spokes and an airbag module;
    one or more switches disposed on the one or more spokes; and
    a bezel disposed adjacent to the airbag module, the entire bezel being movably mounted to the steering wheel to contact any of the one or more switches to actuate the horn.

2. A motor vehicle including the assembly of claim 1.

3. The assembly of claim 1, wherein the bezel is axially movable relative to the steering wheel to contact the any of the one or more switches without contacting the airbag module.

4. The assembly of claim 3, wherein the bezel includes a plurality of axially movable wings for contacting the any of the one or more switches.

5. The assembly of claim 4, wherein each of the one or more switches is a micro switch disposed adjacent to one or more displaceable or compressible bosses.

6. The assembly of claim 4, wherein each of the one or more switches is a micro switch disposed adjacent to one or more compressible springs.

7. The assembly of claim 4, wherein each of the one or more switches is a metal contact disposed adjacent to one or more displaceable or compressible bosses, and the bezel wings include cooperating metal contacts for completing an electrical circuit.

8. A steering wheel assembly for a motor vehicle, comprising:
    a steering wheel having a rim, a hub, and one or more spokes connecting the rim and hub;
    an airbag module;
    one or more horn activating switches disposed on the one or more spokes; and
    a bezel disposed adjacent to the airbag module, the bezel being movably mounted to the steering wheel to contact any of the one or more horn activating switches,
    wherein the entire bezel is axially movable relative to the steering wheel to contact the any of the one or more horn activating switches without contacting the airbag module.

9. A motor vehicle including the assembly of claim 8.

10. The assembly of claim 8, wherein the bezel includes one or more axially movable wings for contacting the any of the one or more horn activating switches.

11. The assembly of claim 10, wherein each of the one or more horn activating switches is a micro switch disposed adjacent to one or more displaceable or compressible bosses.

12. The assembly of claim 10, wherein each of the one or more horn activating switches is a micro switch disposed adjacent to one or more compressible springs.

13. The assembly of claim 10, wherein each of the one or more horn activating switches is a metal contact disposed adjacent to one or more displaceable or compressible bosses, and the bezel wings include cooperating metal contacts for completing an electrical circuit.

14. A method for actuating a motor vehicle horn, comprising:
    providing a horn;
    providing a steering wheel having a hub connected to a rim by one or more spokes and an airbag module, further including providing one or more horn actuator switches disposed on the one or more spokes; and
    providing a bezel disposed adjacent to the airbag module, an entirety of the bezel being movably mounted to the steering wheel to actuate the horn by pressing on a portion of the bezel to contact any of the one or more horn actuator switches.

15. The method of claim 14, including configuring the bezel for axial movement relative to the steering wheel to contact the any of the one or more horn actuator switches without contacting the airbag module.

16. The method of claim 15, including providing the bezel with a plurality of axially movable wings for contacting the any of the one or more switches.

17. The method of claim 16, including providing each of the one or more switches as a micro switch disposed adjacent to one or more displaceable or compressible posts.

18. The method of claim 16, including providing each of the one or more switches as a micro switch disposed adjacent to one or more compressible springs.

19. The method of claim 16, including providing a closeable electrical circuit for activating a horn by providing each of the one or more switches as a metal contact disposed adjacent to one or more displaceable or compressible posts on the one or more spokes and a cooperating metal contact disposed on each of the one or more bezel wings.

* * * * *